May 29, 1956   L. R. JONES   2,747,888
RETRACTABLE TRAILER STEP
Filed June 30, 1953   2 Sheets-Sheet 1
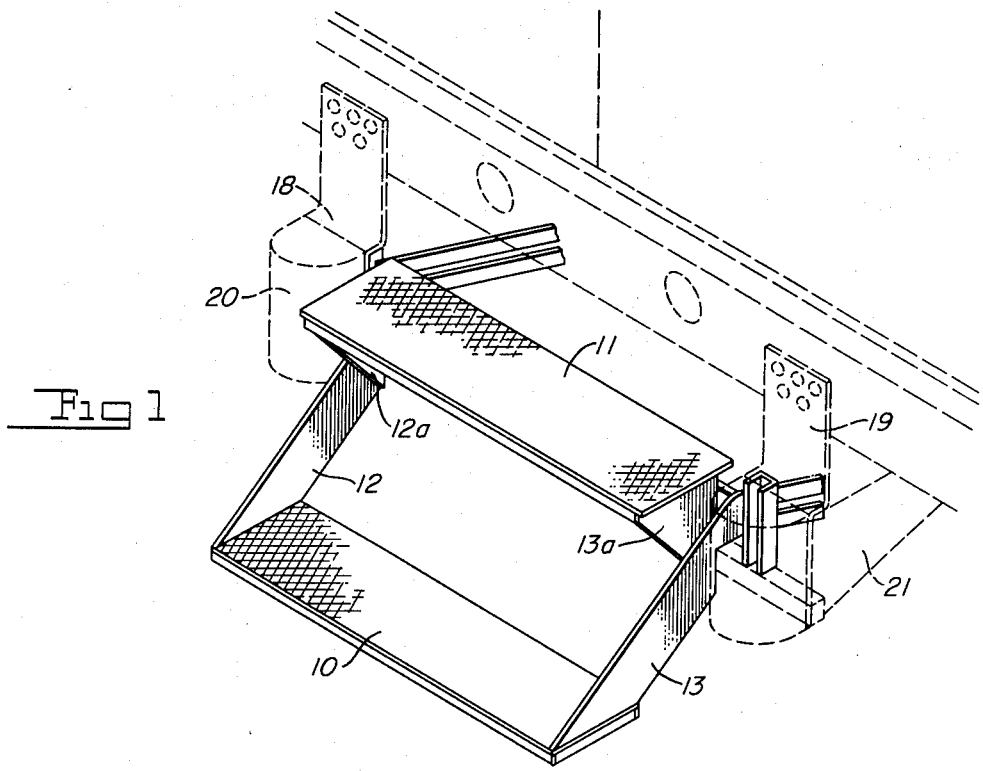
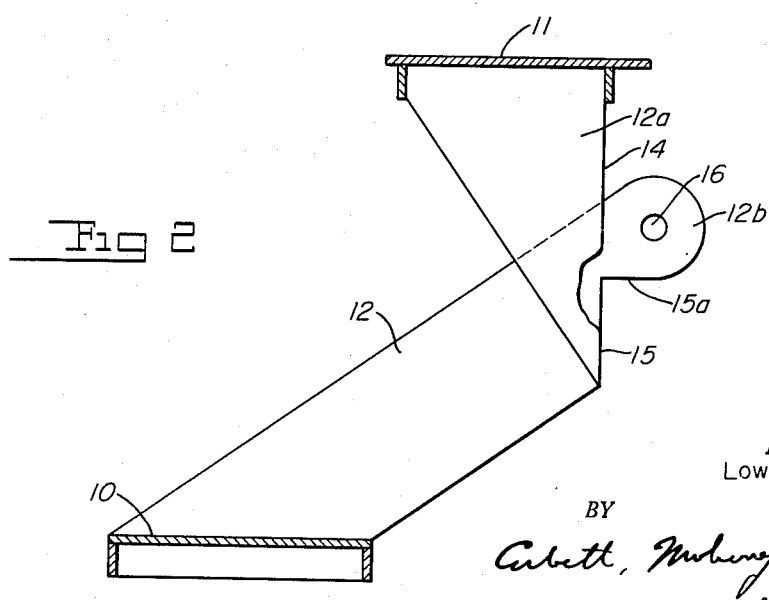
INVENTOR.
Lowell R. Jones
BY
*Corbett, Mahoney + Miller*
ATTORNEYS.

United States Patent Office 2,747,888
Patented May 29, 1956

2,747,888

RETRACTABLE TRAILER STEP

Lowell R. Jones, Columbus, Ohio

Application June 30, 1953, Serial No. 365,092

3 Claims. (Cl. 280—166)

My invention relates to a retractable trailer step. It has to do, more specifically, with a retractable step arrangement for use at the rear end of a semi-trailer to facilitate loading and unloading thereof.

Trailers of the truck-tractor and semi-trailer type are very high at their rear end. This end is usually provided with swinging doors so as to permit loading and unloading. The height of the rear end of the trailer makes the loading and unloading difficult, especially if the cargo consists of a number of small articles to be delivered. However, a step arrangement for facilitating loading and unloading must not only be properly positioned for use but must be capable of being retracted into an out-of-the-way position where it will not be damaged when it is not in use. It must be easily movable between its two positions and in both positions, especially in the retracted position, it must be rigidly supported so that it will not vibrate and rattle. In operative position it must be sufficiently strong and rigid to support the weight of a man and whatever he is carrying into or out of the trailer.

It is the object of my invention to provide a simple inexpensive step arrangement especially useful on a semi-trailer to facilitate loading and unloading thereof, the step arrangement being easily movable between extended position when in use and retracted position when not in use, and the step arrangement being of a rugged structure so that when in extended position it will amply support a man and his load and being supported rigidly in either position to prevent vibration.

The preferred embodiment of my invention is illustrated in the accompanying drawings wherein similar characters of reference designate corresponding parts and wherein:

Figure 1 is a perspective view showing my step arrangement at the rear end of a trailer, the step being shown extended.

Figure 2 is a vertical sectional view through the step structure which is not attached to the trailer.

Figure 3:
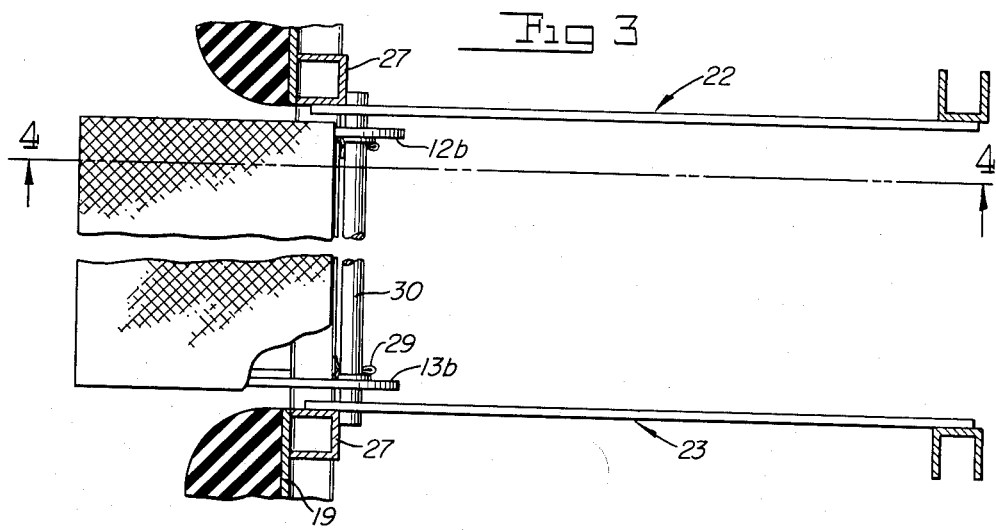
Figure 3 is a horizontal sectional view showing the mounting structure of the step arrangement.

With reference to the drawings, I have illustrated my step arrangement applied to the rear-end of a trailer of the "Fruehauf" type. However, although it can easily be applied to a trailer of this type, it can also be applied to other types of trailers.

My step arrangement comprises a lower step 10 and upper step 11 which are rigidly secured together. It is preferred that this step arrangement be fabricated from sufficiently heavy steel plates and the plates of the steps 10 and 11 may be of the steel-tread type. Because these trailers are comparatively high, it is preferred to use two steps arranged as indicated. The lower step 10 is welded or otherwise rigidly secured to the lower ends of side brackets 12 and 13. The upper step 11 is welded or otherwise rigidly secured to triangular-shaped brackets 12a and 13a which are positioned within and in flat contact with the respective brackets 12 and 13 to which they are welded or otherwise suitably secured. The upper end of each of the brackets 12 and 13 is provided with the forwardly extending pivot ears 12b which extend from the main part thereof. It will be noted from Figure 2 that each of the brackets 12a and 13a is provided with a straight forward edge 14 which aligns with a straight forward edge 15 on the associated bracket 12 or 13. Each of the pivot ears 12b and 13b is provided with an opening 16 for receiving a pivot rod. It will be apparent also from Figure 2 that the steps 10 and 11 are disposed in parallel relationship with the step 11 located ahead of the step 10.

Figure 4:
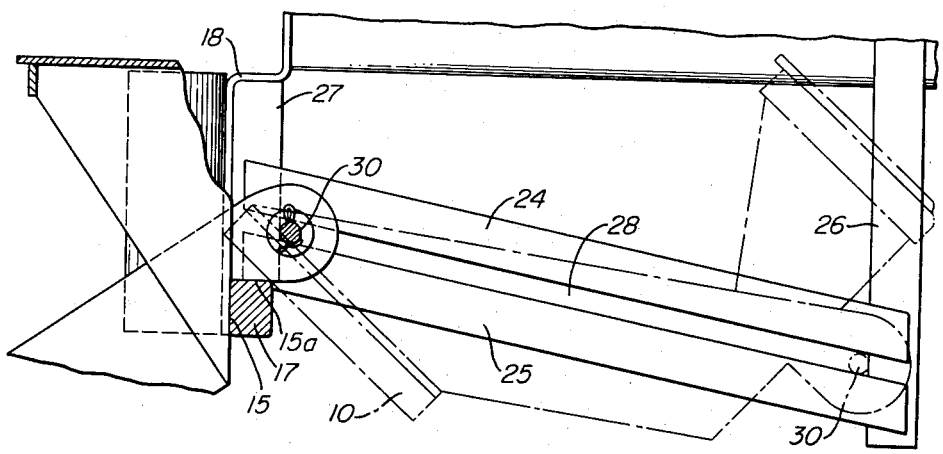
Figure 4 is a vertical sectional view taken along line 4—4 of Figure 3.

As shown in Figures 1, 3 and 4, this type of trailer is provided with a bumper bar 17 which extends transversely at the rear end of the trailer and is positioned substantially below the bed of the trailer. This bar is carried by depending brackets 18 and 19 which are secured to the main frame and each of which carries a rubber bumper 20 at its rear side. These brackets 18 and 19 are each braced by a triangular plate 21 which is secured to the bracket and to the main frame. The bumper bar 17 is secured to the brackets 18 and 19 at the lower end thereof.

My step arrangement is adapted to be so disposed that it can be moved between the brackets 18 and 19 from its extended position to its retracted position. For this purpose it is mounted on suitable guide tracks 22 and 23 which are attached to the frame of the trailer below its rear end.

Each of these guide tracks, as shown in Figure 4, comprises a pair of vertically spaced longitudinally extending bars 24 and 25. The rear ends of these bars are suitably attached or welded in spaced relationship to a vertical channel 26 and the front ends of these bars are attached in spaced relationship to a similar channel 27. Each of the channels 27 is positioned above the bumper bar 17 and is welded or otherwise secured to the associated bracket 18 or 19. Each of the channels 26 has its upper end welded or otherwise secured to the main frame of the trailer from which it depends. It will be noted from Figure 4 that the channels 26 and 27 are of such lengths that with the bars 24 and 25 attached to the lower ends thereof, the bars 24 and 25 will be inclined forwardly and downwardly. Thus, the tracks 22 and 23 will be rigidly attached to the main frame of the trailer in forwardly and downwardly inclined relationship and transversely parallel with each other. To attach the step arrangement to the tracks or guides 22 or 23, a transverse pivot rod 30 is employed. This rod is passed transversely through the pivot ears 12b and 13b on the step structure after the ears are positioned within the tracks 22 and 23. The rod 30, as shown in Figure 3, extends outwardly into the guide space 28 provided between each pair of bars 24 and 25. Cotter pins 29 are provided in transverse openings in the rod 30 just within the ears 12b and 13b to keep the rod so positioned transversely that its ends will normally extend beyond the guides or tracks 22 and 23.

With the step structure in extended position for use, it will appear as shown in Figure 1 and as indicated in the full line position in Figure 4. At this time the rod 30 will have moved rearwardly and upwardly in the guides 22 and 23 until its ends contact the forward sides of the channels 27. At the same time, the lower edge of each ear 12b and 13b, which is straight as indicated at 15a, will contact with the top edge of the bar 17 and the vertical edges 14 and 15 of the brackets 12a and 13a and 12 and 13 will contact with the rear edge of the bar 17. Thus, this will provide a rigid support for the step structure which, at this time, will be so located that the steps 10 and 11 will be horizontally disposed at the rear of the trailer. It will be noted that the step 11 will be located a suitable stepping distance below the bed of the trailer at this time.

To retract the step structure, it is merely necessary to apply a slight lifting force on the lower step 10 which will cause the structure to move forwardly and downwardly between the brackets 18 and 19 and underneath the bed of the trailer. The rod 30 will slide forwardly and downwardly along the guides or tracks 22 and 23. The upper step 11 will swing downwardly and forwardly during the initial retraction of the step structure so that it will miss the rear edge of the bed of the trailer. The step structure can be easily pushed forwardly with the rod 30 sliding along the guides 22 and 23 until, as shown by broken lines in Figure 4, the rod 30 strikes the vertical channels 26. At this time, the lower step 10 will be in forwardly and downwardly inclined position and will be resting on the forward and upper corner of the bumper bar 17. The result will be that the step structure will be wedged between the bar 17 and the channels 26 so that it will stay in retracted position and will not vibrate.

In again retracting the step structure, it can be pulled easily rearwardly by gripping the lower step 10 and pulling it up over the bar 17 since it will pivot about the rod 30. Then, as the step structure is retracted, the bar 30 will move rearwardly and upwardly along the guides 22 and 23 and the step structure can then be swung downwardly, the upper step 11 just missing the rear edge of the trailer bed as the step structure swings downwardly about the rod 30.

It will be apparent that I have provided a trailer step structure which can be attached to standard trailers without any changes in the main frame thereof, the step attaching means merely embodying additional members secured to the frame. The step structure can be extended or retracted readily. In extended condition it will readily support the weight of a man and his load. When retracted it will remain in retracted condition, without vibration, the weight of the step structure aiding in the wedging action which will keep the step structure in retracted position.

Having thus described my invention what I claim is:

1. In combination with a vehicle having a bumper bar extending transversely thereof at the rear end and below the bed frame thereof, said bumper bar being carried by brackets depending from said bed frame, a step structure movable between extended and retracted positions through the space between said bumper bar and the rear end of the bed frame and between said brackets, a pair of guides each of which is composed of spaced parallel bars having their rear ends secured to said brackets and their forward ends secured to supports depending from the bed frame and extending downwardly and forwardly from said bar, a transverse rod extending through openings in the step structure and into said guides to connect the step structure to said guides so that when in extended position the step structure is in engagement with and is supported by said bar and when in retracted position is disposed ahead of and in engagement with said bar, said step structure including a pair of steps each of which is in horizontal position when the step structure is extended and the lower one of which is in angular position when the step structure is retracted and will wedge against said bar to keep the ends of the rod at the forward lower ends of said guides, said lower step being attached to the lower ends of side plates, the upper step being attached to triangular plates secured to the upper ends of said side plates and each of said triangular plates having a vertical forward edge which is the edge that engages the rear edge of the bumper bar when the step structure is retracted, the upper ends of said side plates having a vertical edge which coincides with said edge of the triangular plates and a horizontal edge which engages the upper ends of the bumper bar, said side plates having forwardly extending lugs which have the openings which receive said pivot rod.

2. In combination with a vehicle having a bumper bar extending transversely thereof at the rear end and below the bed frame thereof, a step structure movable between extended and retracted positions through the space between said bumper bar and the rear end of the bed frame, said step structure being connected by pivots to guides which extend forwardly and downwardly from said bar so that when in extended position the step structure is in engagement with and is supported by said bar and when in retracted position it is disposed ahead of and in engagement with said bar so that the pivots will tend to remain at the forward lower ends of said guides, said step structure including a pair of steps each of which is in horizontal position when the step structure is extended and the lower one of which is in angular position when the step structure is retracted so that it will extend downwardly and forwardly in engagement with said bar so as to wedge the step structure ahead of said bar to keep the pivots at the forward lower end of said guides, said pivots including a transverse rod which extends through openings in the step structure and into said guides, said step structure including supporting edges disposed at right angles to each other and which engage the top and rear edges of said bar when the step structure is in extended position.

3. In combination with a vehicle having a bumper bar extending transversely thereof at the rear end and below the bed frame thereof, a step structure movable between extended and retracted positions through the space between said bumper bar and the rear end of the bed frame, said step structure being connected by pivots to guides which extend forwardly and downwardly from said bar so that when in extended position the step structure is in engagement with and is supported by said bar and when in retracted position it is disposed ahead of and in engagement with said bar so that the pivots will tend to remain at the forward lower ends of said guides, said step structure including a step which is in horizontal position when the step structure is extended and is in angular position when the step structure is retracted so that it will extend downwardly and forwardly in engagement with said bar so as to wedge the step structure ahead of said bar to keep the pivots at the forward lower ends of said guides, said pivots including a transverse rod which extends through openings in the step structure and into said guides, said step structure including supporting edges disposed at right angles to each other and which engage the top and rear edges of said bar when the step structure is in extended position.

References Cited in the file of this patent

UNITED STATES PATENTS

| | | |
|---|---|---|
| 1,148,356 | Chickering | July 27, 1915 |
| 2,457,380 | Kelberger | Dec. 28, 1948 |
| 2,492,068 | Schofield | Dec. 20, 1949 |
| 2,678,831 | Fisher | May 18, 1954 |